United States Patent
Koyama et al.

(10) Patent No.: US 7,366,657 B2
(45) Date of Patent: Apr. 29, 2008

(54) VOICE SIGNAL PROCESSING SYSTEM MOUNTED WITH ECHO CANCELLER AND VOICE SIGNAL PROCESSING METHOD

(75) Inventors: Kazuhiko Koyama, Tokyo (JP); Yasushi Numata, Tokyo (JP)

(73) Assignee: NEC Corporation (JP)

( * ) Notice: Subject to any disclaimer, the term of this patent is extended or adjusted under 35 U.S.C. 154(b) by 766 days.

(21) Appl. No.: 10/420,016

(22) Filed: Apr. 18, 2003

(65) Prior Publication Data

US 2003/0200082 A1   Oct. 23, 2003

(30) Foreign Application Priority Data

Apr. 19, 2002  (JP)  ............... 2002-118114

(51) Int. Cl.
*G10L 21/02* (2006.01)
(52) U.S. Cl. .................................... 704/201
(58) Field of Classification Search ............... None
See application file for complete search history.

(56) References Cited

U.S. PATENT DOCUMENTS 5,636,323 A * 6/1997 Umemoto et al. .......... 704/226
6,700,979 B1 * 3/2004 Washiya ................ 379/406.09

FOREIGN PATENT DOCUMENTS

| JP | 63-219217 | 9/1988 |
| JP | 05-110694 | 4/1993 |
| JP | 6-216811 | 8/1994 |
| JP | 2001-094479 | 4/2001 |

OTHER PUBLICATIONS

Office Action issued by Japanese Patent Office on Dec. 19, 2006 in connection with corresponding Japanese application No. 2002-118114.
English translation of relevant portions of Japanese Office Action dated Dec. 19, 2006 issued in connection with corresponding Japanese application NO. 2002-118114.

* cited by examiner

*Primary Examiner*—Susan McFadden
(74) *Attorney, Agent, or Firm*—Ostrolenk, Faber, Gerb & Soffen, LLP (57) ABSTRACT

In order to prevent generation of a trapezoidal signal waveform due to limitations on dynamic ranges in an echo canceller and an echo path as voice signal transmission paths, a voice signal processing circuit of the voice signal processing system processes a waveform such that its signal level falls within the narrowest dynamic range without causing an overshoot and waveform crack. Process of a signal waveform is selectively conducted only of a waveform of a voice signal whose signal level is high to be liable to have distortion. As to a voice signal whose signal level is low and originally within a dynamic range, the signal is transmitted without having its waveform processed.

8 Claims, 8 Drawing Sheets

VOICE SIGNAL PROCESSING SYSTEM MOUNTED WITH ECHO CANCELLER AND VOICE SIGNAL PROCESSING METHOD

BACKGROUND OF THE INVENTION

1. Field of the Invention

The present invention relates to a voice signal processing system and a voice signal processing method in a voice communication system mounted with an echo canceller.

2. Description of the Related Art

In recent years, an adaptive echo canceller whose representative is the ITU-T G. 168 standard is used in a voice communication circuit adopting TDM (time division multiplexing) system such as a PBX (private branch exchange).

Among conventional art related to the present invention is Japanese Patent Laying-Open (Kokai) No. Heisei 6-216811. Japanese Patent Laying-Open (Kokai) No. Heisei 6-216811 discloses a technique of, noticing signal waveform distortion generated because when transmitting a voice signal of an excessive level in a circuit including an echo canceller, the voice signal level exceeds a dynamic range of a circuit inside an echo path, controlling a maximum signal level to fall within the dynamic range to suppress the signal waveform distortion, thereby enabling the echo canceller to exert its performance.

As recited in the above-described Japanese Patent Laying-Open (Kokai) No. Heisei 6-216811, however, simple control of an excessive voice signal level to prevent the level from exceeding a dynamic range makes a voice waveform be a trapezoidal form, resulting in that the echo canceller can not cancel echoes satisfactorily. This is because when a signal waveform applied to an echo path is trapezoidal, signal waveform distortion is caused due to transient response characteristics of a circuit (D/A converter etc.) in the echo path. In other words, also the signal waveform distortion caused by transient response characteristics prevents operation of the echo canceller.

The above-described Japanese Patent Laying-Open (Kokai) No. Heisei 6-216811 thus conducts only signal level limitation without taking transient response characteristics into consideration, so that it is hard to say that suppression of signal waveform distortion can be satisfactorily realized. In other words, because nonlinear signal waveform distortion caused due to transient characteristics of CODEC (coder/decoder) in the echo path hinders operation of an adaptive echo canceller, echoes can not be satisfactorily cancelled.

SUMMARY OF THE INVENITON

The present invention is intended to solve the above-described problem and aims at providing a voice signal processing system and a voice signal processing method which enable natural speaking with reduced echoes by conducting voice signal processing so as to suppress waveform distortion caused within an echo path, thereby making an echo canceller to exert its maximum performance as a result.

According to the first aspect of the invention, a voice signal processing system comprises an adaptive echo canceller for adaptively canceling echoes generated in an input/output transmission path to a communication terminal, and voice signal processing means for processing a waveform of a speech reception voice signal to be input to the communication terminal through the adaptive echo canceller into a waveform which is unlikely to have distortion.

In the preferred construction, the voice signal processing means detects whether the level of the speech reception voice signal is within a predetermined range or not and when the level is outside the range, processes the waveform of the speech reception voice signal to fall within the narrowest dynamic range in the input/output transmission path, and when the level is within the range, transmits the speech reception voice signal to the adaptive echo canceller without processing.

In another preferred construction, the voice signal processing means, when processing the waveform of the speech reception voice signal, rounds corners of the waveform.

In another preferred construction, the predetermined range is set to be a range narrower than a dynamic range in the input/output transmission path.

According to the second aspect of the invention, a voice signal processing method, comprises a voice signal processing step of processing a waveform of a speech reception voice signal to be input to a communication terminal through an adaptive echo canceller into a waveform which is unlikely to have distortion, a pseudo echo generation step of generating a pseudo echo by the adaptive echo canceller based on the speech reception voice signal processed at the voice signal processing step, and an adaptive echo canceling step of subtracting the pseudo echo generated at the pseudo echo generation step from a speech transmission voice signal which is transmitted from the communication terminal and contains an echo generated in an input/output transmission path to adaptively cancel the echo by means of the adaptive echo canceller.

In the preferred construction, the voice signal processing step detects whether the level of the speech reception voice signal is within a predetermined range or not and when the level is outside the range, processes the waveform of the speech reception voice signal to fall within the narrowest dynamic range in the input/output transmission path, and when the level is within the range, transmits the speech reception voice signal to the adaptive echo canceller without processing.

In another preferred construction, the voice signal processing step, when processing the waveform of the speech reception voice signal, rounds corners of the waveform.

In another preferred construction, the predetermined range is set to be a range narrower than a dynamic range in the input/output transmission path.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, an embodiment of the present invention will be described in detail with reference to the accompanying drawings.

Figure 1:
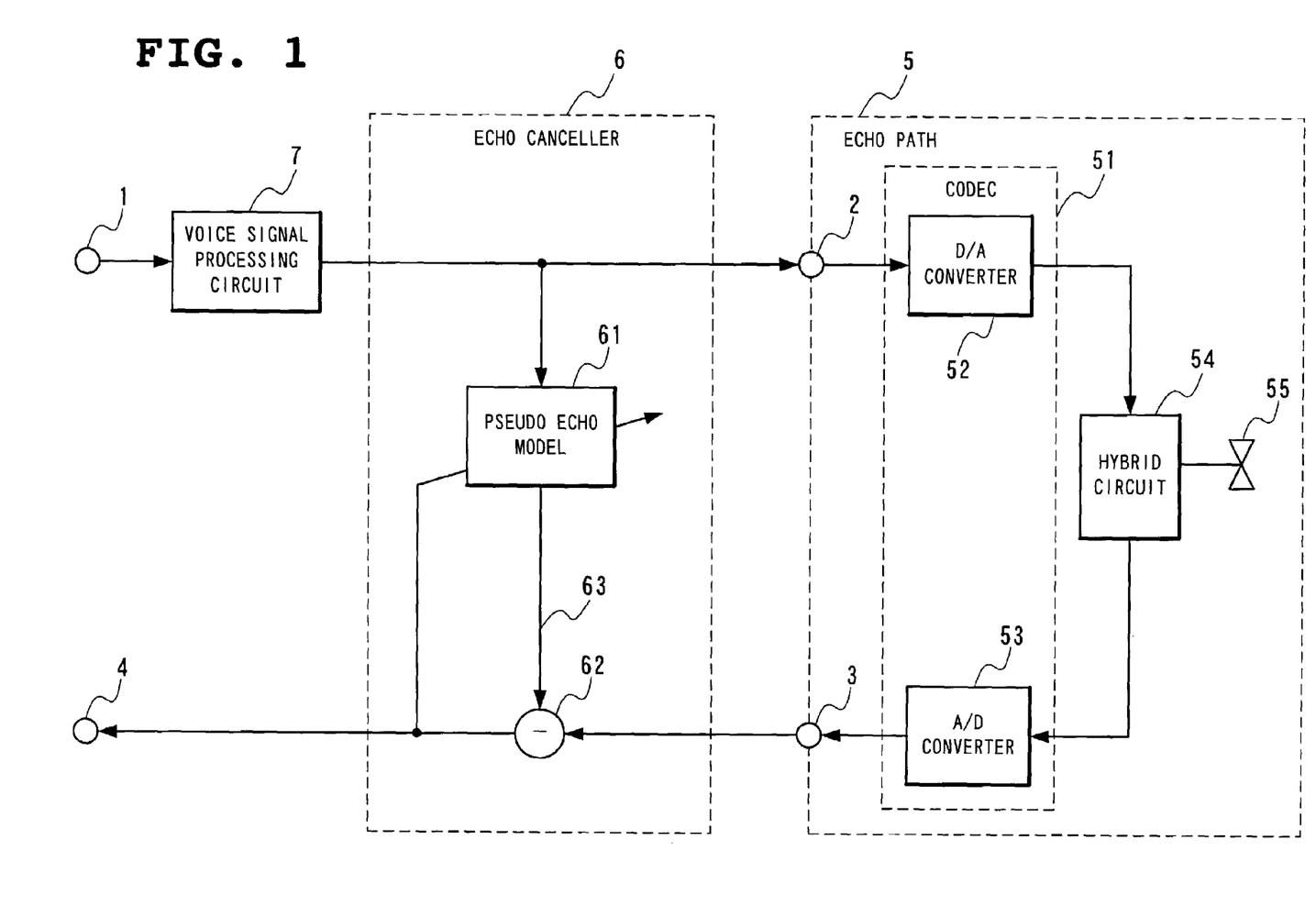
FIG. 1 is a circuit diagram showing a structure of a voice signal processing system according to an embodiment of the present invention.

FIG. 1 is a circuit diagram showing a structure of a voice signal processing system according to an embodiment of the present invention. The voice signal processing system includes a voice signal processing circuit 7, an echo canceller 6 and an echo path 5.

Characteristic function of the present invention is held by the voice signal processing circuit 7. The voice signal processing circuit 7 processes a signal waveform of a speech reception signal applied through a speech reception signal input terminal 1 such that such waveform distortion as can not be predicted by the echo canceller 6 is unlikely to occur during signal transmission. Then, the circuit outputs the voice signal having been processed from a speech reception signal output terminal 2 to the echo path 5, as well as applying the processed signal to the echo canceller 6 as an original signal for the prediction of an echo signal.

The echo path 5 is a voice signal transmission path in which echoes might be generated. As an example in FIG. 1, the echo path 5 includes a CODEC 51 having a D/A converter 52 and an A/D converter 53, a hybrid circuit 54 for two lines-four lines signal conversion, and a communication terminal 55.

The echo canceller 6 is an adaptive echo canceller whose representative is the ITU-T G. 168 standard known to those skilled in the art. In operation, subtract a pseudo echo 63 generated by a pseudo echo model 61 from a signal containing an actual echo which is applied through a speech transmission signal input terminal 3 by means of a subtractor 62 to cancel the echo and output the obtained signal from a speech transmission signal output terminal 4.

The echo canceller 6 has a function of predicting at this time an echo signal to be generated by approximating the pseudo echo model 61 to the characteristics of the echo path 5 based on impulse response of the echo path 5, thereby adaptively canceling an echo signal according to a change of the characteristics of the echo path 5. The function of adapting to a change of characteristics of the echo path 5 is useful particularly in such a case where a party to be spoken to and a voice signal transmission path vary with each calling as a PBX (private branch exchange).

As is clear from the foregoing description, the more adaptively the pseudo echo model 61 is approximated to the characteristics of the echo path 5 to have less deviation of the pseudo echo 63 generated by the pseudo echo model 61 from an actual echo signal, the more excellent echo cancellation characteristics the echo canceller 6 obtains.

On the other hand, the echo canceller 6 predicts an echo having a linear characteristic based on a speech reception signal to generate the pseudo echo 63 by means of the pseudo echo model 61. Accordingly, if nonlinear waveform distortion is generated in the echo path 5, waveform distortion that can not be predicted by the echo canceller 6 will be contained in an actual echo signal, so that the pseudo echo will deviate from the actual echo. This deviation hinders operation of the echo canceller 6 which approximates the pseudo echo model 61 to the characteristics of the echo path 5, as well as causing deterioration of echo cancellation characteristics of the echo canceller 6.

By selectively processing a part of a waveform which is likely to have unpredictable nonlinear distortion while being transmitted on the signal transmission path by means of the voice signal processing circuit 7, the present invention makes waveform distortion hardly occur. This arrangement facilitates approximation of the pseudo echo model 61 to the characteristics of the echo path 5, as well as preventing an actual echo signal from containing waveform distortion unpredictable by the echo canceller 6, thereby reducing deviation between the pseudo echo model 61 and the characteristics of the echo path 5 to allow the echo canceller 6 to exert its capacity to the maximum.

Figure 3:
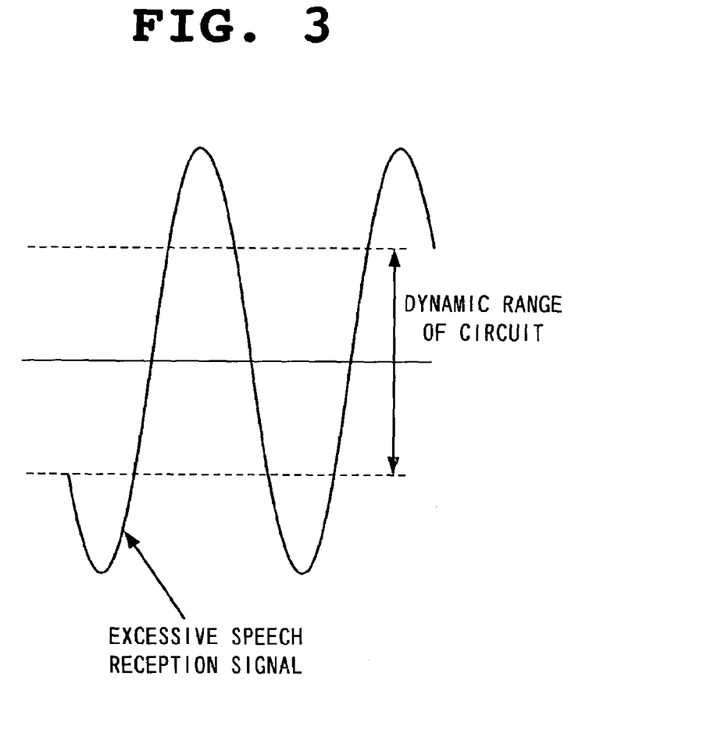
FIG. 3 is a diagram showing one example of a speech reception signal applied to a speech reception signal input terminal 1.

Next, description will be made of operation of the voice signal processing system according to the present embodiment of the present invention. First, consideration will be given to a case where two kinds of speech reception signals are applied to the speech reception signal input terminal 1 of the voice signal processing system. First speech reception signal is such an excessive speech reception signal whose voice signal level exceeds a dynamic range of a circuit as shown in FIG. 3. Second speech reception signal is such a speech reception signal whose level is within the dynamic range as shown in FIG. 4.

Figure 4:
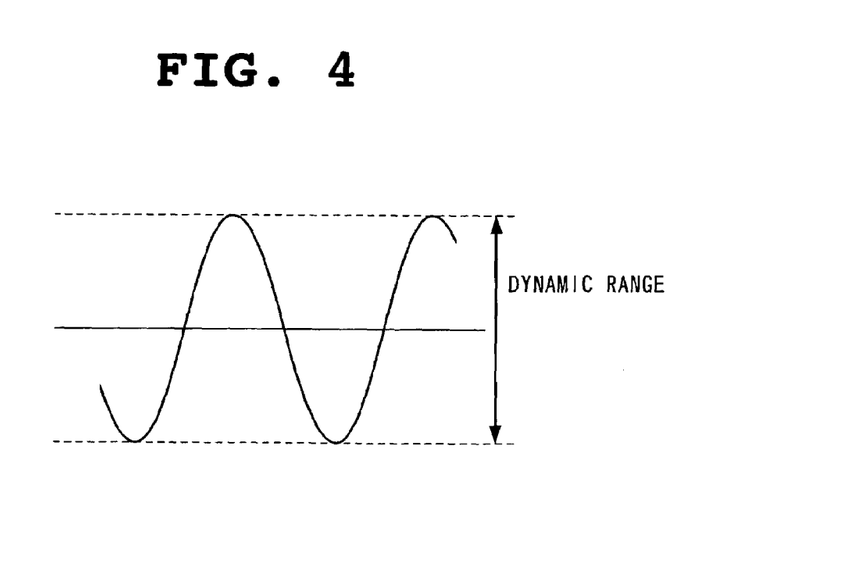
FIG. 4 is a diagram showing one example of a speech reception signal applied to the speech reception signal input terminal 1.
Figure 5:
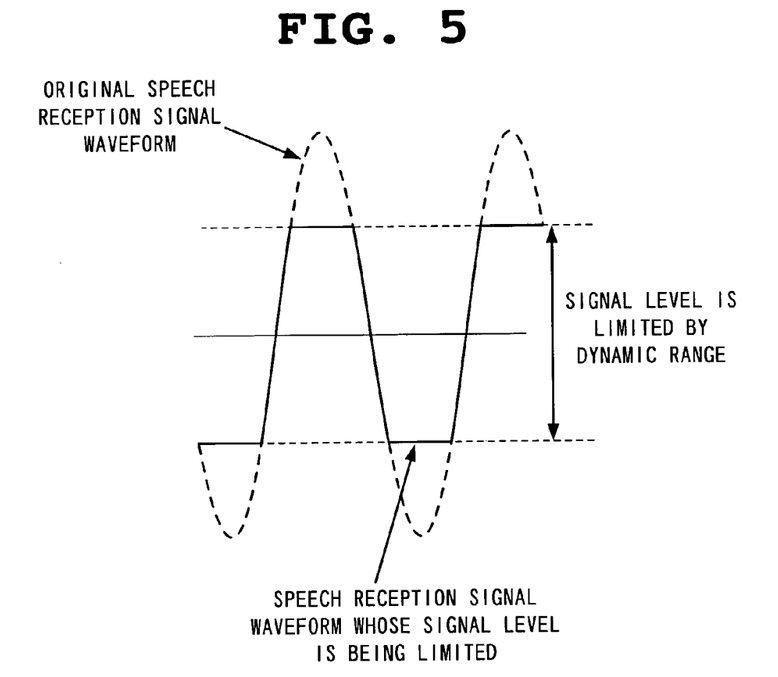
FIG. 5 is a diagram showing one example of a speech reception signal applied to the speech reception signal input terminal 1.
Figure 10:
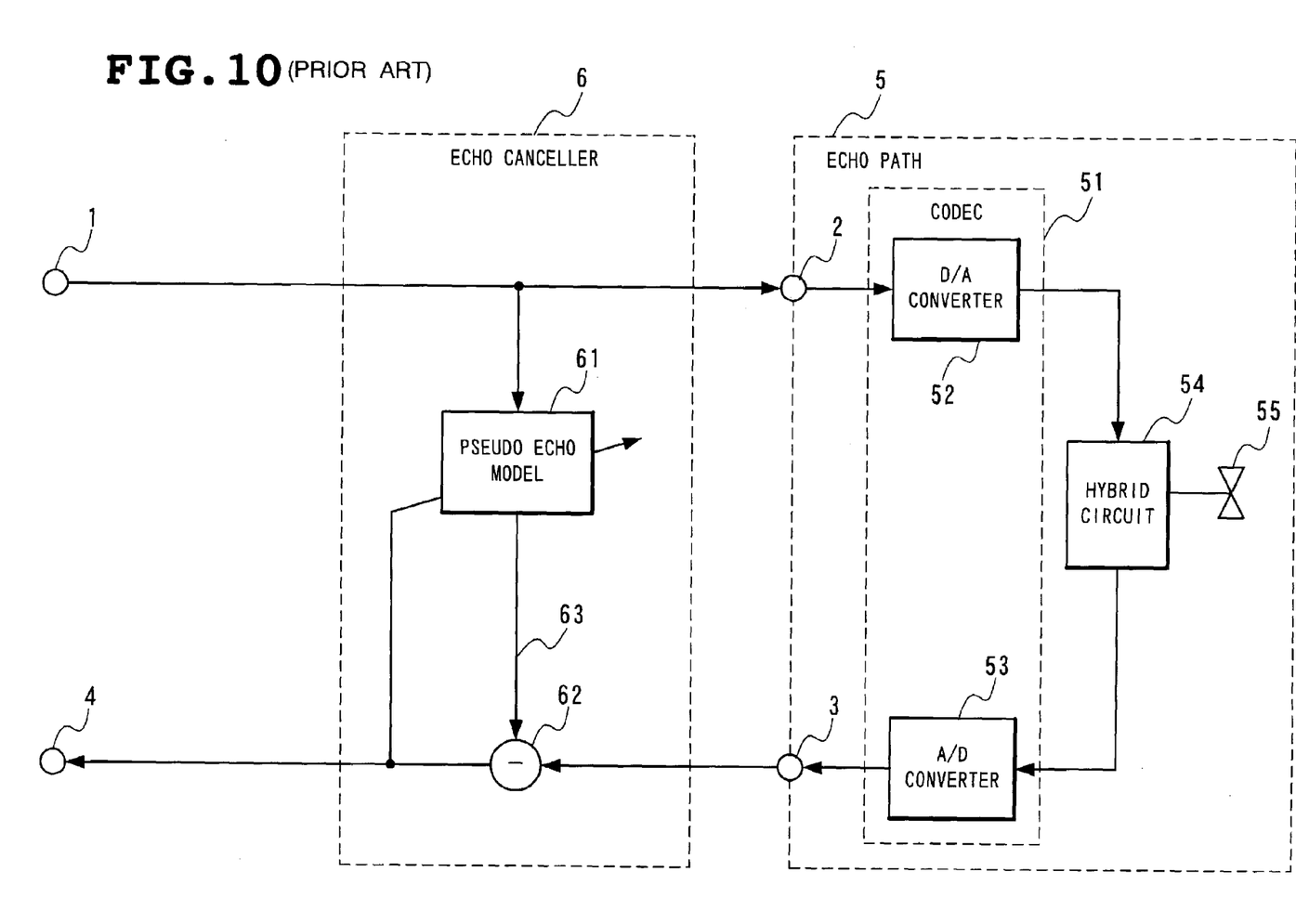
FIG. 10 is a circuit diagram showing a structure of a conventional voice signal processing system.

With a conventional signal processing system shown in FIG. 10 having no countermeasure, no problem occurs in particular when the speech reception signal shown in FIG. 4 whose level is within the dynamic range of the circuit is applied. When the excessive speech reception signal whose level exceeds the dynamic range shown in FIG. 3 is applied, however, while the voice signal is transmitted, the signal level will be limited by the dynamic range of the circuit to have such a trapezoidal signal waveform as shown in FIG. 5.

Figure 6:
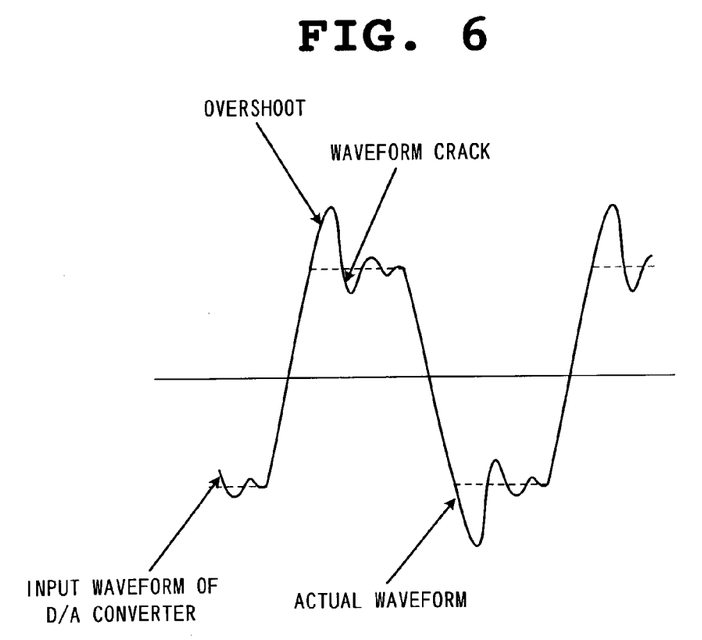
FIG. 6 is a diagram showing one example of a speech reception signal applied to the speech reception signal input terminal 1.

Furthermore, due to the effects of the transient response characteristics of the D/A converter 52, the transmitted voice signal and an echo waveform generated will have distorted waveforms including an overshoot or waveform crack, as shown in FIG. 6 for example. Because such an echo waveform can not be predicted by the echo canceller 6, a pseudo echo waveform generated within the echo canceller 6 and an actual echo waveform will deviate largely from each other, so that the echo canceller 6 can not satisfactorily cancel the echoes.

Figure 7:
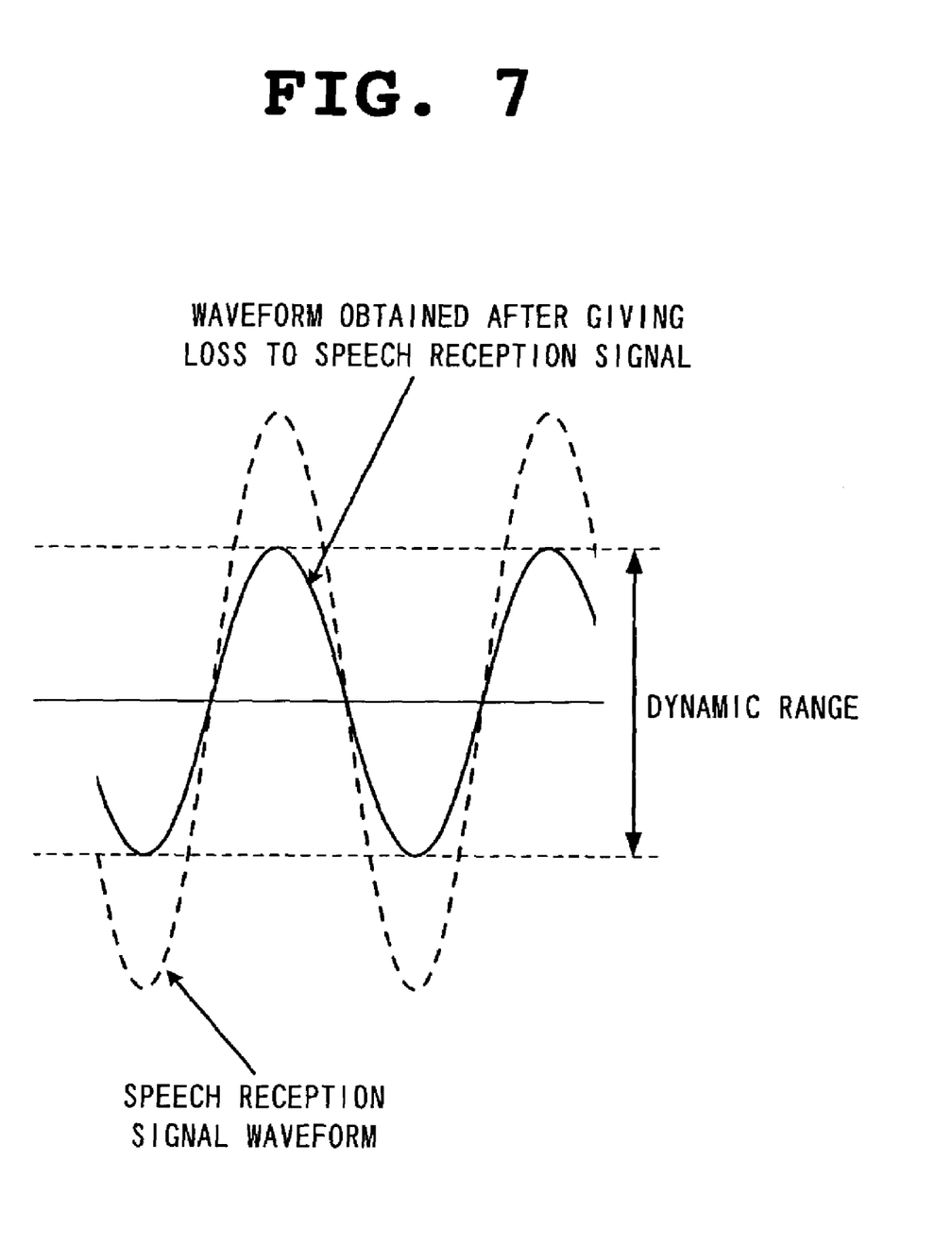
FIG. 7 is a diagram showing one example of a speech reception signal applied to the speech reception signal input terminal 1.
Figure 11:
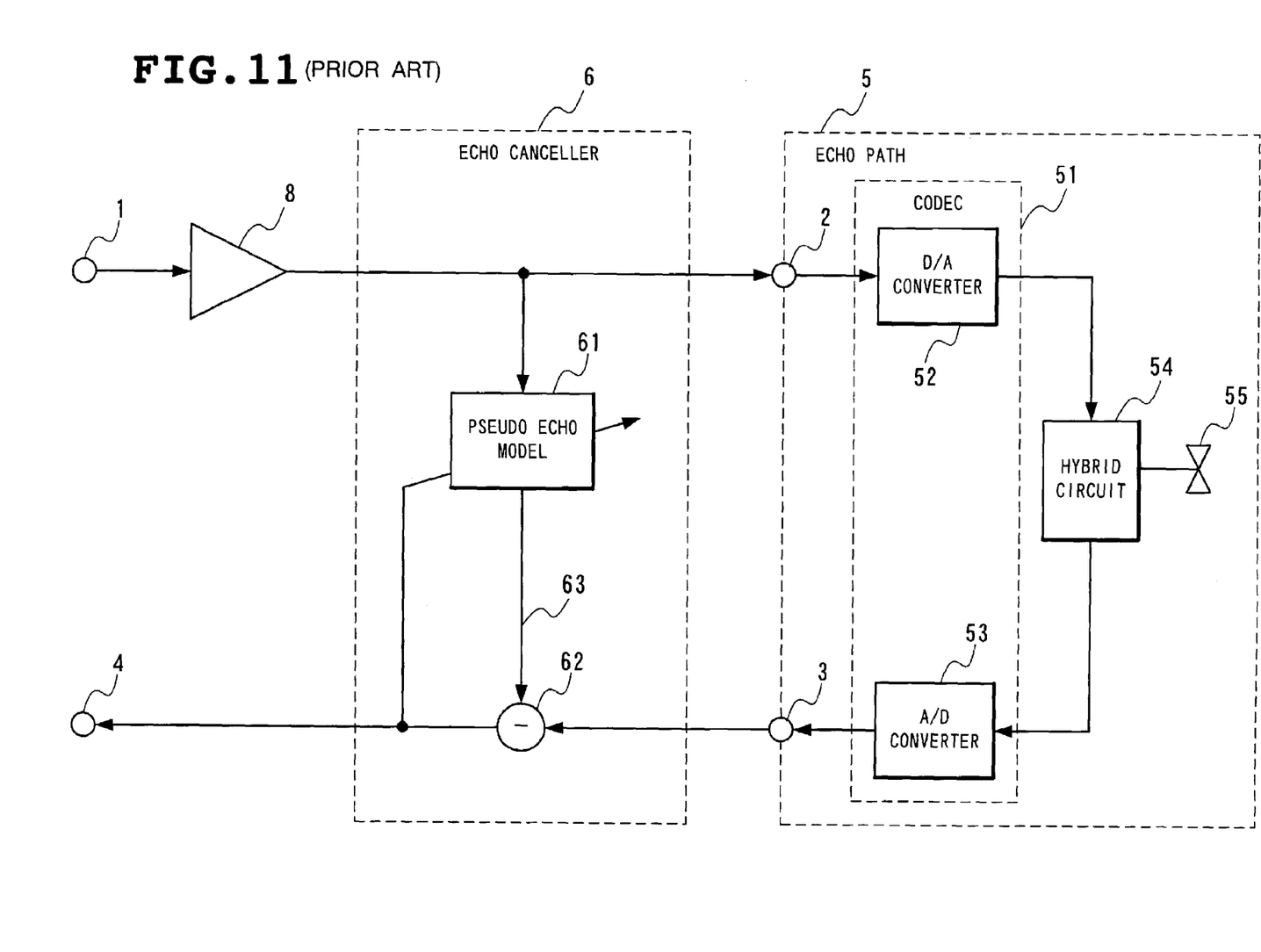
FIG. 11 is a circuit diagram showing a structure of a conventional voice signal processing system.

In order to make the most of the capacity of the echo canceller 6, it is necessary to adopt measures against a speech reception voice signal of an excessive level. According to well-known conventional art, an attenuation circuit 8 which applies a loss to a speech reception signal is provided between the speech reception signal input terminal 1 and the echo canceller 6 to place a level of a speech reception signal within a dynamic range as illustrated in FIG. 11. FIG. 7 shows that a loss is applied to a speech reception signal to place the level of the speech reception signal within the dynamic range. Application of this method eliminates the problem that signal waveform distortion hinders operation of the echo canceller 6. It still remains a problem, however, that since levels of all the speech reception signals are lowered, normal speaking voice whose level is originally within the dynamic range will have a lower signal level to make it hard to listen.

To cope with the problem, it is premised in the present embodiment on that the voice signal processing circuit 7 of the voice signal processing system shown in FIG. 1 operates as follows. First, in order to prevent generation of a trapezoidal signal waveform due to limitations on dynamic ranges in the echo canceller 6 and the echo path 5 which are voice signal transmission paths, a waveform of a signal is processed such that its signal level is placed within the narrowest dynamic range without causing an overshoot and waveform crack. Signal waveform process is selectively made only of a waveform of a voice signal which is liable to have distortion because of its high voice signal level. Signal whose voice signal level is low and originally within the dynamic range will be transmitted without having its waveform processed.

Figure 2:
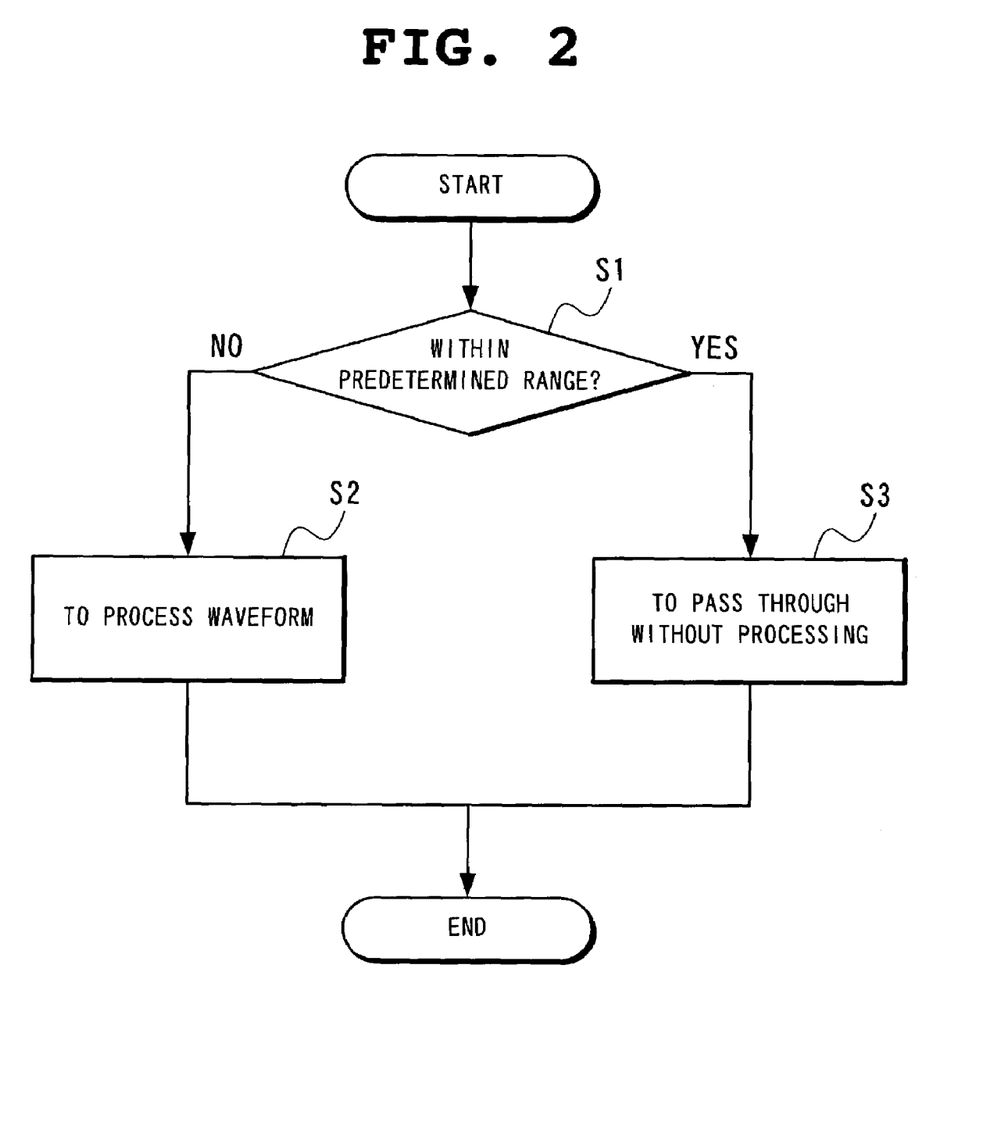
FIG. 2 is a flow chart for use in explaining a voice signal processing method according to the embodiment of the present invention.

The foregoing processing will be described based on the flow chart of FIG. 2. First, the voice signal processing circuit 7 determines whether an applied speech reception signal level is within a predetermined dynamic range set in advance or not (Step S1). When the speech reception signal level exceeds the predetermined range (NO at Step S1), process the waveform so as to fall within the dynamic range (Step S2). When the speech reception signal level is within the predetermined range (YES at Step S1), pass the speech reception signal through without processing (Step S3).

Figure 8:
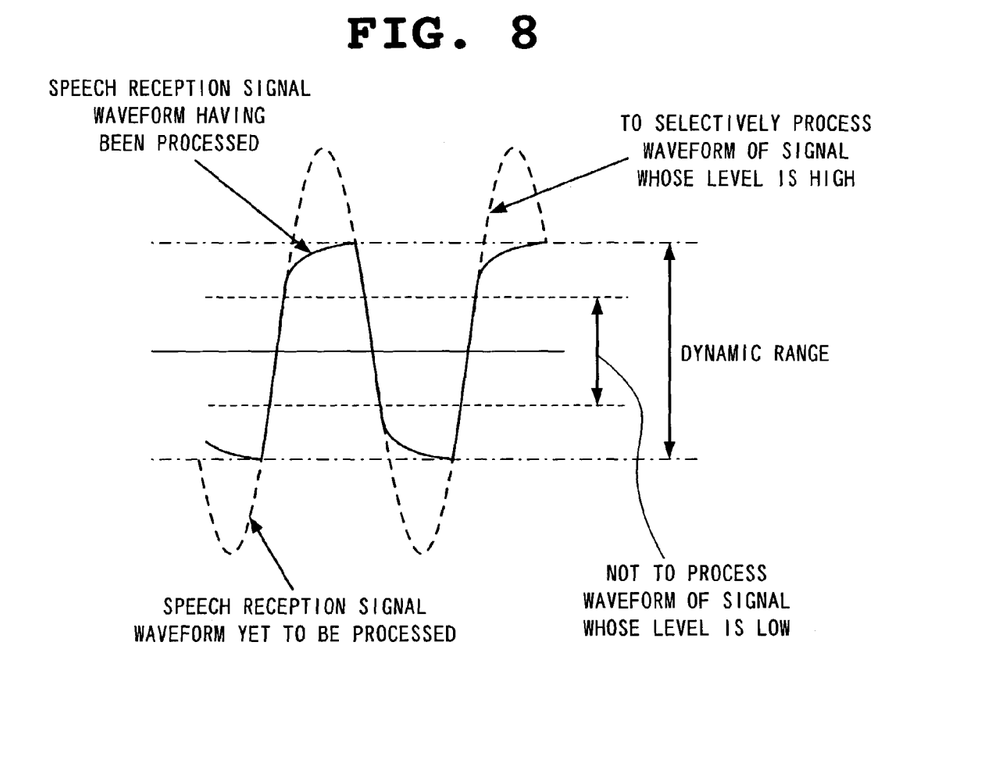
FIG. 8 is a diagram showing one example of a speech reception signal applied to the speech reception signal input terminal 1.
Figure 9:
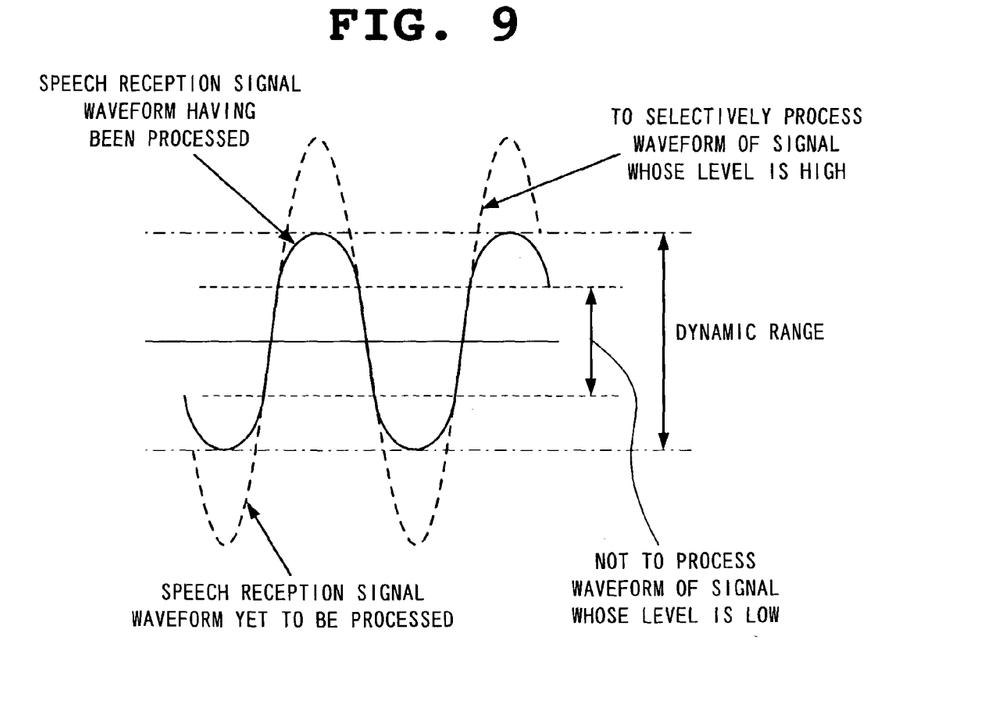
FIG. 9 is a diagram showing one example of a speech reception signal applied to the speech reception signal input terminal 1.

Examples of processing of a waveform of a signal whose level is in excess of the dynamic range shown in FIG. 3 by means of thus arranged voice signal processing circuit 7 are illustrated in FIGS. 8 and 9. In the example shown in FIG. 8, signals of high levels are selectively processed to place the entire waveform within the dynamic range. In the figure, a range provided inside the dynamic range is a range as a threshold. The range as a threshold is set in consideration of a dynamic range in a transmission path and a probability that an overshoot and waveform crack will occur.

In addition, corners of the waveform are rounded in order to suppress an overshoot caused by the effect of the transient characteristics of the D/A converter 52. By this arrangement, a speech reception signal of an excessive level is made to fall within the dynamic range to suppress occurrence of distortion of an echo waveform that can not be predicted by the echo canceller 6. Although substantially the same as the example of FIG. 8, the example in which corners of the waveform are further rounded is shown in FIG. 9.

Both examples shown in FIG. 8 and FIG. 9, in which signal waveform distortion that can not be predicted by the echo canceller 6 is suppressed, hinder no operation of the echo canceller 6. In addition, since a low level signal is transmitted without having its waveform processed, clearer speaking voice can be obtained than that obtained by conventional techniques which apply a loss to the entire voice signal level.

The embodiment of the present invention is as described in the foregoing. Since other parts (echo canceller 6, echo path 5, etc.) than the voice signal processing circuit 7 which is a feature of the present invention are well known to those skilled in the art and not directly related to the present invention, detailed description of their structures will be omitted.

The above-described embodiment is by way of an example of preferred embodiments of the present invention and is not to be taken by way of limitation and the present invention can be embodied in various forms without departing from its gist.

As is clear from the foregoing description, the present invention enables generation of echo signal waveform distortion that can not be predicted by an echo canceller to be suppressed. It is therefore possible to provide natural speaking with reduced echoes by making the echo canceller exert its performance to the maximum.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A voice signal processing system, comprising:
an adaptive echo canceller for adaptively canceling echoes generated in an input/output transmission path to a communication terminal, and
voice signal processing means for processing a waveform of a speech reception voice signal to be input to said communication terminal through said adaptive echo canceller into a waveform which is unlikely to have distortion,
wherein said adaptive echo canceller generates a pseudo echo based on the processed speech reception voice signal and
the voice signal processing means processes the speech reception voice signal only if the waveform is outside a predetermined range.

2. The voice signal processing system as set forth in claim 1, wherein said voice signal processing means detects whether a level of said speech reception voice signal is within the predetermined range and
when the level is outside said range, processes the waveform of said speech reception voice signal to fall within the narrowest dynamic range in said input/output transmission path, and
when the level is within said range, transmits said speech reception voice signal to said adaptive echo canceller without processing.

3. The voice signal processing system as set forth in claim 2, wherein said voice signal processing means, when processing the waveform of said speech reception voice signal, rounds corners of said waveform.

4. The voice signal processing system as set forth in claim 2, wherein said predetermined range is set to be a range narrower than a dynamic range in said input/output transmission path.

5. A voice signal processing method, comprising:
- a voice signal processing step of processing a waveform of a speech reception voice signal to be input to a communication terminal through an adaptive echo canceller into a waveform which is unlikely to have distortion,
- a pseudo echo generation step of generating a pseudo echo by said adaptive echo canceller based on the speech reception voice signal processed at said voice signal processing step, and
- an adaptive echo canceling step of subtracting the pseudo echo generated at said pseudo echo generation step from a speech transmission voice signal which is transmitted from said communication terminal and contains an echo generated in an input/output transmission path to adaptively cancel said echo by means of said adaptive echo canceller, wherein the voice signal processing step processes the speech reception voice signal only if the waveform is outside a predetermined range.

6. The voice signal processing method as set forth in claim 5, wherein said voice signal processing step detects whether a level of said speech reception voice signal is within the predetermined range and
- when the level is outside said range, processes the waveform of said speech reception voice signal to fall within the narrowest dynamic range in said input/output transmission path, and
- when the level is within said range, transmits said speech reception voice signal to said adaptive echo canceller without processing.

7. The voice signal processing method as set forth in claim 6, wherein said voice signal processing step, when processing the waveform of said speech reception voice signal, rounds corners of said waveform.

8. The voice signal processing method as set forth in claim 6, wherein said predetermined range is set to be a range narrower than a dynamic range in said input/output transmission path.

* * * * *